US009690734B2

(12) United States Patent
Kapoor

(10) Patent No.: US 9,690,734 B2
(45) Date of Patent: Jun. 27, 2017

(54) QUASI-OPTIMIZED INTERCONNECTION NETWORK FOR, AND METHOD OF, INTERCONNECTING NODES IN LARGE-SCALE, PARALLEL SYSTEMS

(71) Applicant: Arjun Kapoor, Old Westbury, NY (US)

(72) Inventor: Arjun Kapoor, Old Westbury, NY (US)

( * ) Notice: Subject to any disclaimer, the term of this patent is extended or adjusted under 35 U.S.C. 154(b) by 182 days.

(21) Appl. No.: 14/847,200

(22) Filed: Sep. 8, 2015

(65) Prior Publication Data

US 2016/0070668 A1 Mar. 10, 2016

Related U.S. Application Data

(60) Provisional application No. 62/048,379, filed on Sep. 10, 2014.

(51) Int. Cl.
*G06F 13/00* (2006.01)
*G06F 13/40* (2006.01)

(52) U.S. Cl.
CPC .......... *G06F 13/4004* (2013.01); *G06F 13/00* (2013.01); *G06F 13/40* (2013.01)

(58) Field of Classification Search
CPC ....... G06F 13/4004; G06F 13/40; G06F 13/00
See application file for complete search history.

(56) References Cited

U.S. PATENT DOCUMENTS

| 5,513,371 A | 4/1996 | Cypher et al. |
| 5,852,407 A | 12/1998 | Ishii et al. |
| 6,055,599 A | 4/2000 | Han et al. |
| 8,159,973 B2 | 4/2012 | Deng et al. |
| 8,510,535 B2 | 8/2013 | Deng et al. |
| 9,178,784 B2* | 11/2015 | Ballew .................. G06F 9/5077 |
| 2011/0213946 A1* | 9/2011 | Ajima .................. G06F 15/803 712/11 |
| 2012/0331269 A1* | 12/2012 | Aras ................. G06F 15/17375 712/29 |
| 2013/0083701 A1* | 4/2013 | Tomic .................. H04L 12/462 370/255 |

(Continued)

FOREIGN PATENT DOCUMENTS

| CN | 104579786 | 4/2015 |
| EP | 0551188 | 7/1993 |

OTHER PUBLICATIONS

"Interconnection Networks", by Anant Agarwal at MIT, Fall 2010.*

(Continued)

*Primary Examiner* — Jing-Yih Shyu
(74) *Attorney, Agent, or Firm* — Kirschstein, Israel, Schiffmiller & Pieroni, P.C.

(57) ABSTRACT

A plurality of data links interconnects a number (N) of nodes of a large-scale, parallel system with minimum data transfer latency. A maximum number (K) of the data links connect each node to the other nodes. The number (N) of the nodes is related to the maximum number (K) of the data links by the expression: $N=2^K$. An average distance (A) of the shortest distances between all pairs of the nodes, and a diameter (D), which is a largest of the shortest distances, are minimized.

12 Claims, 3 Drawing Sheets

(56) References Cited

U.S. PATENT DOCUMENTS

2014/0244706 A1  8/2014  Zhang et al.

OTHER PUBLICATIONS

"Interconnection Networks" CMU 15-418, Spring 2012.*
"Interconnection Networks" by Wen-Chi Hou at Southern Illinois University, Spring 2015.*
"On designing efficient interconnection networks optimized for multiple objectives" Dissertation by Wai Hong Ho, Aug. 2006.*
"Interconnection Networks" Revised by Timothy Mark Pinkston, USC, and Jose Duato, UPV and Simula, Jul. 14, 2006.*

* cited by examiner

US 9,690,734 B2

QUASI-OPTIMIZED INTERCONNECTION NETWORK FOR, AND METHOD OF, INTERCONNECTING NODES IN LARGE-SCALE, PARALLEL SYSTEMS

BACKGROUND OF THE INVENTION

The present disclosure relates generally to interconnection networks or advanced networking architectures in large-scale, parallel processing systems and parallel storage systems, and, more particularly, to a quasi-optimized interconnection network for, and a method of, interconnecting a number of processing cores or nodes in such systems to minimize time delay for data communication between such nodes.

It is known to employ a supercomputer having a high-level of computational capacity to minimize processing time for large, intensive calculations in various fields, such as telecommunications, biochemistry, and theoretical physics, among others. These calculations are often performed through the use of large-scale, parallel processing by central processing units (CPUs), whereby multiple calculations are performed simultaneously on multiple independent processor cores, also known as "nodes." Data must be passed and shared between these nodes for the whole supercomputer to function cohesively. As CPU clock speeds approach the limit imposed by the laws of physics, competitive supercomputers typically add and couple more and more nodes to the interconnection network, and this arrangement or topology of a multitude of nodes, in turn, tends to increase the latency or time delay to initiate data passing between the nodes. A lengthy latency can become a bottleneck for sharing data, thereby degrading supercomputer performance.

Current supercomputers are growing so rapidly in complexity that new and efficient topologies cannot be developed fast enough to keep up with the growth in the number of nodes. In effect, supercomputers, today, are designed with relatively inefficient topologies that have simple, symmetrical, and easy-to-construct designs, such as the known Mesh interconnection network of FIG. 1 in which the nodes are interconnected in multiple rows and columns, or the known Torus interconnection network of FIG. 2. While the Mesh and Torus networks, and their known derivatives, such as the Packed Exponential Connections, the Shifted Recursive Torus, the TESH, the Interlaced Bypass Torus, and the Recursive Diagonal Torus, are easy to construct and have been applied industrially given their simple design, these topologies have proven in practice to he extremely inefficient with regards to the time delay for data communication within large-scale, parallel systems, or other large-scale systems with a multitude of nodes.

Another known interconnection network topology is the Hypercube network of FIG. 3, which is slightly more efficient than the Mesh and Torus networks with regards to the time delay. However, the size or diameter of the Hypercube network grows very quickly as more nodes are added. The diameter is defined as the largest of the distances between all pairs of the nodes. The increased size is also true for the derivatives of the Hypercube network.

The lack of low-latency, low diameter, and high efficiency, interconnection networks available has now become a major challenge in creating massive processing and storage systems in the supercomputing industry, as more effective interconnection networks are needed to make faster, smaller, and more energy-efficient, large-scale, parallel systems.

Accordingly, it would be desirable to more optimally arrange the nodes in a topology that minimizes latency, that minimizes the size of the interconnection network, and that makes the interconnection network more energy-efficient, while still maintaining production feasibility.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
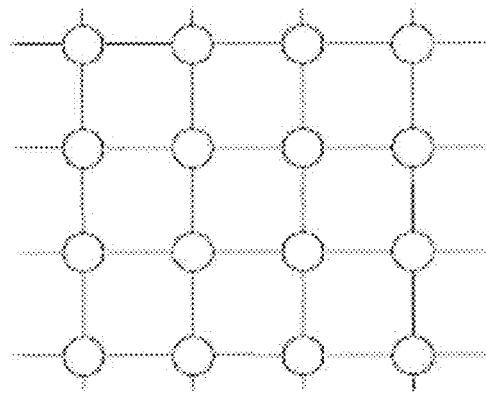
FIG. 1 is a two-dimensional view of multiple nodes interconnected in a known Mesh interconnection network in accordance with the prior art.
Figure 2:
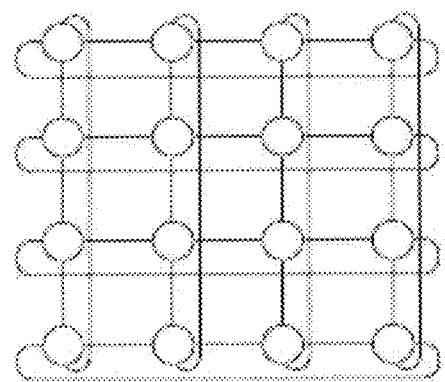
FIG. 2 is a two-dimensional view of multiple nodes interconnected in a known Torus interconnection network in accordance with the prior art.

Skilled artisans will appreciate that elements in the figures are illustrated for simplicity and clarity and have not necessarily been drawn to scale. For example, the dimensions and locations of some of the elements in the figures may be exaggerated relative to other elements to help to improve understanding of embodiments of the present invention.

The system and method components have been represented where appropriate by conventional symbols in the drawings, showing only those specific details that are pertinent to understanding the embodiments of the present invention so as not to obscure the disclosure with details that will he readily apparent to those of ordinary skill in the art having the benefit of the description herein.

DETAILED DESCRIPTION OF THE INVENTION

One aspect of this disclosure relates to a quasi-optimized interconnection network for interconnecting a number (N) of nodes of a large-scale, parallel system, such as a supercomputer. The interconnection network includes a plurality of data links for interconnecting the nodes with minimum data transfer latency. A maximum number (K) of the data links connects each node to the other nodes. The number (N) of the nodes is related to the maximum number (K) of the data links by the expression: $N=2^K$. A shortest distance between all pairs of the nodes is the total number of the data links traversed on the shortest path between each pair. An average distance (A) of the shortest distances between all pairs of the nodes is a minimum value. A diameter (D), which is a largest of the shortest distances, is also a minimum value.

Another aspect of this disclosure relates to a method of interconnecting a number (N) of nodes of a large-scale, parallel system. The method is performed by interconnecting the nodes with a plurality of data links for minimum data transfer latency, by connecting each node to the other nodes with a maximum number (K) of the data links, by relating the number (N) of the nodes to the maximum number (K) of the data links by the expression: $N=2^K$, by configuring a shortest distance between all pairs of the nodes as a total number of the data links traversed on the shortest path between each pair, by configuring an average distance (A) of the shortest distances between all pairs of the nodes as a minimum value, and by configuring a diameter (D), which is a largest of the shortest distances, as a minimum value.

In accordance with this disclosure, a quasi-optimized interconnection network, whose N and K values are related as defined by the above relation, and whose A and D values are minimal, minimizes the time delay in the interconnection network, enhances interconnection network performance and efficiency, and minimizes the size of the interconnection network, thereby advancing not only the field of computing in general, especially in high performance computing and massive data storage systems, but also many other fields requiring faster and more powerful supercomputers.

Figure 6:
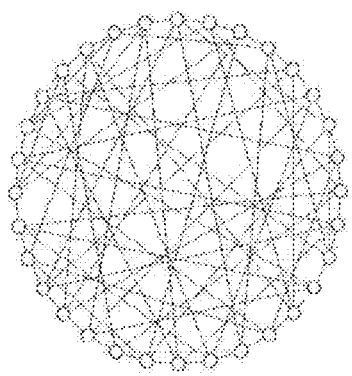
FIG. 6 is a two-dimensional view of thirty-two nodes interconnected in a quasi-optimized interconnection network in accordance with the present disclosure.
Figure 5:
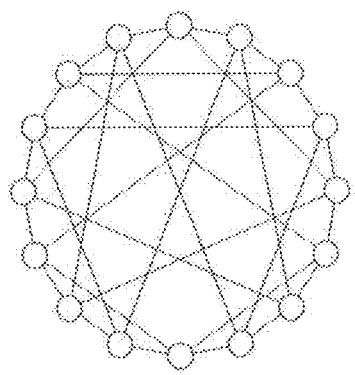
FIG. 5 is a two-dimensional view of sixteen nodes interconnected in a quasi-optimized interconnection network in accordance with the present disclosure.
Figure 4:
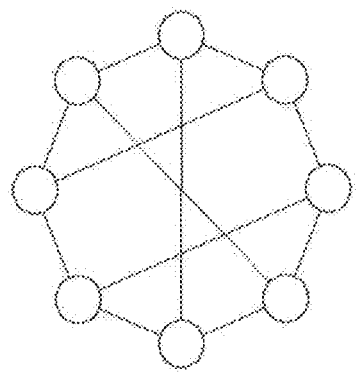
FIG. 4 is a two-dimensional view of eight nodes interconnected in a quasi-optimized interconnection network in accordance with the present disclosure.

Referring now to FIGS. 4-6, the nodes or processing cores of a large-scale, parallel system, such as a supercomputer, are represented by circles, and the data links for interconnecting the nodes are represented by straight lines. A quasi-optimized interconnection network interconnects a number (N) of the nodes with a plurality of the data links. A maximum number (K) of the data links, also known as the degree, connects each node to the other nodes. The number (N) of the nodes is related to the maximum number (K) of the data links by the expression: $N=2^K$. Thus, in FIG. 4, N=8, and K=3. In FIG. 5, N=16, and K=4. In FIG. 6, N=32, and K=5. Although not illustrated for purposes of drawing clarity, if N=64, then K=6, and so on.

The topologies shown FIGS. 4-6 are two-dimensional representations of the quasi-optimized interconnections to minimize latency of a set of N nodes bounded by a degree of K (the maximum number of data links a given core can have to the other cores). Preferably, a first subset of the data links interconnects adjacent ones of the nodes in series along an annular path, and a second subset of the data links interconnects non-adjacent ones of the nodes transversely across the annular path.

The constraints that define the quasi-optimized network are N, the number of nodes, and K, the degree of the network. In order to measure the optimality of the networks with regards to time delay or latency, two metrics can be used. The first metric is the average distance (A) of the shortest distances between all pairs of the nodes, and the second metric is the diameter (D), which is the largest of these shortest distances. In both cases, the shortest distance between any two nodes is defined as the total number of the data links traversed on the shortest path. Nodes are not allowed to be self-connected, or connected to another node more than once.

The diameter (D) and the average distance (A) can he calculated via standard distance recalculation algorithms, specifically, the well known Dijkstra's algorithm, and are set forth as normalized values in Table 1 below for various values of N and K:

TABLE 1

Diameter and Average Distance Values for Quasi-Optimized Networks

| N | K | Diameter (D) | Mean Path Length (A) |
|---|---|---|---|
| 8 | 3 | 2 | 1.57143 |
| 16 | 4 | 3 | 1.75000 |
| 32 | 5 | 3 | 2.03629 |
| 64 | 6 | 3 | 2.33631 |
| 128 | 7 | 4 | 2.56508 |
| 256 | 8 | 4 | 2.77816 |
| 512 | 9 | 4 | 2.99972 |

Figure 7:
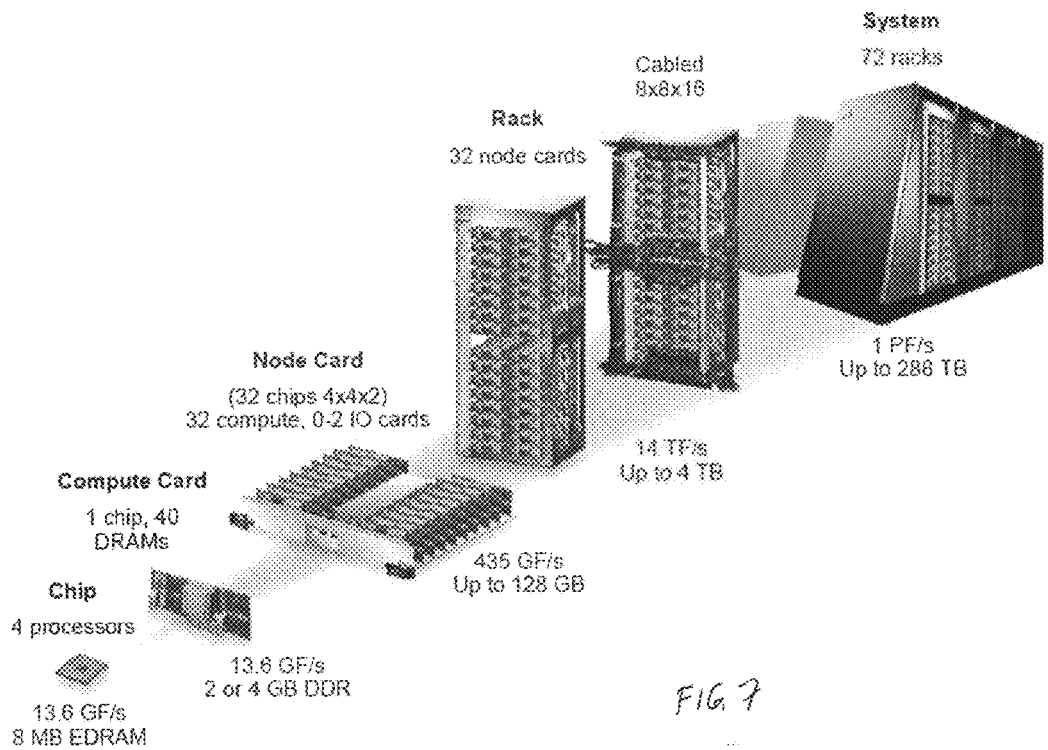
FIG. 7 is a perspective view of a supercomputer that can benefit from the quasi-optimized interconnection network of this disclosure.

The interconnection network topology disclosed herein allows for increased scalability for applications defining the 21$^{st}$ century and has far reaching applications, not only for supercomputer interconnection networks, but also as a method for massive data storage in large network systems. A supercomputer or other parallel system constructed by using any one of these interconnection networks, or by any network which is a combination/variation of the presented interconnection networks could be structured as shown in FIG. 7, by leveraging the massive potential benefits in speed and efficiency of the present disclosure. Each compute card in FIG. 7 could be considered as an individual node. As such, each compute card node would be connected with data links as dictated by the disclosed quasi-optimized interconnection networks. This same concept would also scale to the inter-node-card connections via data links between the individual node cards as dictated by the disclosed quasi-optimized interconnection networks. Similarly, the disclosed quasi-optimized interconnection networks can be applied to the data transfer architecture, or arrangement of data links for inter-rack communication, or even inter-system communication (both hardwired and over the cloud (OTC). That is, not only could one apply the disclosed quasi-optimized interconnection networks to node cards, but they can also be applied to inter-node-card communication, inter-rack communication, and inter-system communication.

Figure 3:
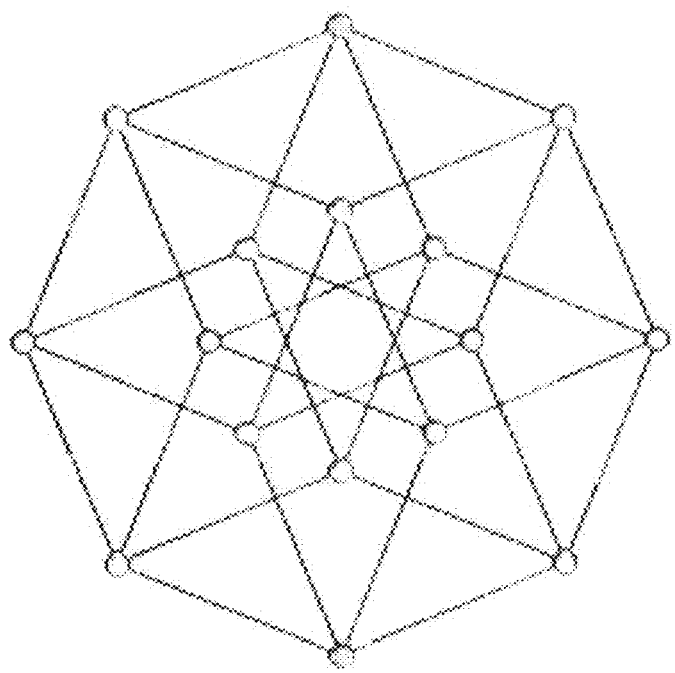
FIG. 3 is a perspective view of multiple nodes interconnected in a known Hypercube interconnection network in accordance with the prior art.
Figure 8:
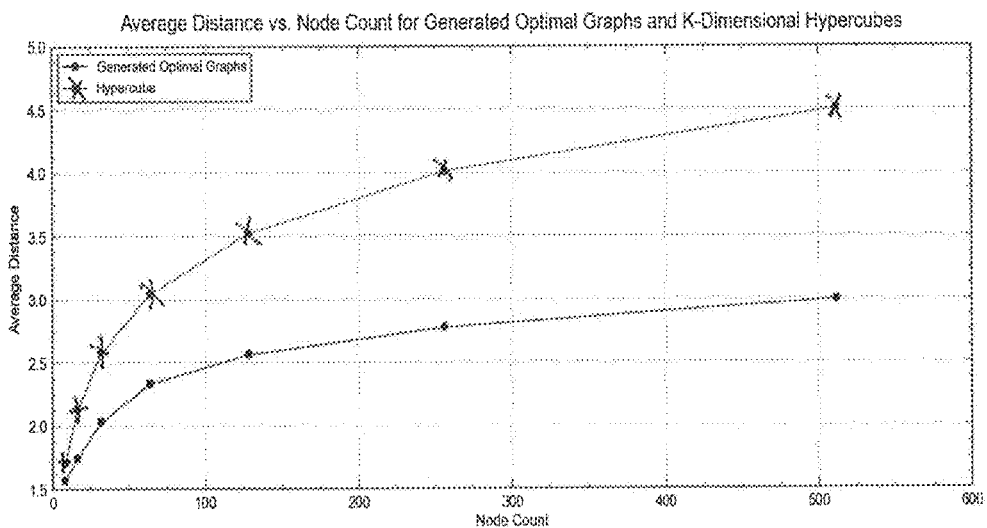
FIG. 8 is a set of graphs comparing the known Hypercube interconnection network of FIG. 3 with the quasi-optimized interconnection network of this disclosure.

The graphs of FIG. 8 chart the average distance (A) versus the number (N) or count of nodes for both the known Hypercube network of FIG. 3 and the quasi-optimized interconnection networks disclosed herein. The graphs show that the quasi-optimized interconnection networks disclosed herein are about 51% more efficient than the known Hypercube network, assuming that the logarithmic trend holds.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions.

The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by "comprises . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being dose to as understood by one of ordinary skill in the art, and in one nonlimiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not he used to interpret or limit the scope or meaning of the claims. In addition, in the foregoing Detailed Description, it can he seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A quasi-optimized interconnection network for interconnecting a number (N) of nodes of a large-scale, parallel system, comprising:
   a plurality of data links for interconnecting the nodes with minimum data transfer latency;
   a maximum number (K) of the data links connecting each node to the other nodes;
   the number (N) of the nodes being related to the maximum number (K) of the data links by the expression: $N=2^K$;
   a shortest distance between all pairs of the nodes being a total number of the data links traversed on the shortest path between each pair;
   an average distance (A) of the shortest distances between all pairs of the nodes being a minimum value; and
   a diameter (D), which is a largest of the shortest distances, being a minimum value.

2. The interconnection network of claim 1, wherein the nodes are processing cores of a processing system.

3. The interconnection network of claim 1, wherein a first subset of the data links interconnect adjacent ones of the nodes in series along an annular path, and wherein a second subset of the data links interconnect non-adjacent ones of the nodes across the annular path.

4. The interconnection network of claim 1, wherein the number (N) of nodes is eight, wherein the maximum number (K) of the data links is three, wherein the minimum value of D is two, and wherein the minimum value of A is about 1.57.

5. The interconnection network of claim 1, wherein the number (N) of nodes is sixteen, wherein the maximum number (K) of the data links is four, wherein the minimum value of D is three, and wherein the minimum value of A is about 1.75.

6. The arrangement of claim 1, wherein the number (N) of nodes is thirty-two, wherein the maximum number (K) of the data links is five, wherein the minimum value of D is three, and wherein the minimum value of A is about 2.04.

7. A method of interconnecting a number (N) of nodes of a large-scale, parallel system, comprising:
   interconnecting the nodes with a plurality of data links for minimum data transfer latency;
   connecting each node to the other nodes with a maximum number (K) of the data links;
   relating the number (N) of the nodes to the maximum number (K) of the data links by the expression: $N=2^K$;
   configuring a shortest distance between all pairs of the nodes as a total number of the data links traversed on the shortest path between each pair;
   configuring an average distance (A) of the shortest distances between all pairs of the nodes as a minimum value; and
   configuring a diameter (D), which is a largest of the shortest distances, as a minimum value.

8. The method of claim 7, and configuring the nodes as processing cores of a processing system.

9. The method of claim 7, and interconnecting adjacent ones of the nodes in series along an annular path, and interconnecting non-adjacent ones of the nodes across the annular path.

10. The method of claim 7, and configuring the number (N) of nodes to be eight, configuring the maximum number (K) of the data links to be three, configuring the minimum value of D to be two, and configuring the minimum value of A to be about 1.57.

11. The method of claim 7, and configuring the number (N) of nodes to be sixteen, configuring the maximum number (K) of the data links to be four, configuring the minimum value of D to be three, and configuring the minimum value of A to be about 1.75.

12. The method of claim 7, and configuring the number (N) of nodes to be thirty-two, configuring the maximum number (K) of the data links to be five, configuring the minimum value of D to be three, and configuring the minimum value of A to be about 2.04.

* * * * *